United States Patent
Kim et al.

(10) Patent No.: US 9,043,900 B1
(45) Date of Patent: May 26, 2015

(54) DISPLAY DEVICE AND METHOD FOR CONTROLLING THE SAME

(71) Applicant: LG ELECTRONICS INC., Seoul (KR)

(72) Inventors: Jihwan Kim, Seoul (KR); Jongho Kim, Seoul (KR); Doyoung Lee, Seoul (KR); Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/223,401

(22) Filed: Mar. 24, 2014

(30) Foreign Application Priority Data

Feb. 5, 2014 (KR) ........................ 10-2014-0012906

(51) Int. Cl.
| | | |
|---|---|---|
| *G06F 12/00* | (2006.01) | |
| *G06F 3/041* | (2006.01) | |
| *G06K 9/00* | (2006.01) | |

(52) U.S. Cl.
CPC ............ *G06F 3/041* (2013.01); *G06K 9/00013* (2013.01)

(58) Field of Classification Search
CPC ......... G06F 21/32; G06F 21/34; G06F 21/36; G06F 21/83; G06F 3/041; G06F 2203/0338
USPC ................ 713/182, 166, 186; 726/16, 20, 19; 455/565
See application file for complete search history.

(56) References Cited

U.S. PATENT DOCUMENTS

| | | | |
|---|---|---|---|
| 8,279,182 B2 | 10/2012 | Kim et al. | |
| 8,443,199 B2 * | 5/2013 | Kim et al. ..................... | 713/182 |
| 8,452,354 B2 * | 5/2013 | Jang et al. .................. | 455/575.4 |
| 2003/0174616 A1 * | 9/2003 | Constantinou et al. .... | 369/53.21 |
| 2006/0128361 A1 * | 6/2006 | Kim .............................. | 455/411 |
| 2010/0240415 A1 | 9/2010 | Kim et al. | |
| 2010/0328032 A1 * | 12/2010 | Rofougaran ................. | 340/5.82 |
| 2011/0141276 A1 * | 6/2011 | Borghei ........................ | 348/143 |
| 2011/0179366 A1 * | 7/2011 | Chae ............................ | 715/764 |
| 2011/0300829 A1 * | 12/2011 | Nurmi et al. ................. | 455/411 |
| 2011/0314539 A1 * | 12/2011 | Horton ........................... | 726/20 |
| 2013/0067546 A1 * | 3/2013 | Thavasi et al. ................... | 726/7 |
| 2013/0135247 A1 | 5/2013 | Na et al. | |
| 2013/0145438 A1 | 6/2013 | Choi et al. | |
| 2013/0191925 A1 | 7/2013 | Ditzman et al. | |
| 2014/0157400 A1 * | 6/2014 | Kwon et al. ................... | 726/16 |

FOREIGN PATENT DOCUMENTS

KR 10-2008-0000481 A 1/2008

* cited by examiner

*Primary Examiner* — Mohammad A Siddiqi
(74) *Attorney, Agent, or Firm* — Birch, Stewart, Kolasch & Birch, LLP

(57) ABSTRACT

A display device is disclosed. The display device comprising: a display unit; a sensor unit; a storage unit; and a processor configured to: provide feedback for indicating a security on state of selected first information when selection input for selecting the first information in the security on state is detected, when a security off input for clearing security is detected in response to the feedback, obtain the fingerprint using the display unit, and convert the first information in the security on state into a security off state when the obtained fingerprint is matched with a pre-stored fingerprint, when a security maintenance input for maintaining security is detected in response to the feedback, maintain the security on state of the first information.

17 Claims, 10 Drawing Sheets

DISPLAY DEVICE AND METHOD FOR CONTROLLING THE SAME

Pursuant to 35 U.S.C. §119(a), this application claims the benefit of Korean Patent Application No. 10-2014-0012906, filed on Feb. 5, 2014, which is hereby incorporated by reference as if fully set forth herein.

BACKGROUND OF THE INVENTION

1. Field of the Invention

The present specification relates to a display device and a method for controlling the same, and more particularly, to a display device that detects security off input or security maintenance input in response to feedback for indicating a security on state, and a method for controlling the display device.

2. Discussion of the Related Art

A display device refers to various types of devices for processing digital data and performing an operation corresponding thereto. As the performance of a display device is improved, it is possible to execute various types of multimedia contents via the display device.

During use of a display device, the user may allow himself or herself only to access specific information. For example, the user may set the display device to restrict access of other people to specific information such as specific photos, pictures, documents, applications, etc. stored in the display device and to be available by himself or herself only. The user may set security for specific information through the display device to restrict access of other people. In this case, the user needs to clear security of the security-set information in order to access the security-set information.

A conventional device provides a user interface for clearing security of security-set information. However, a problem arises in that the user interface makes access of the user to the information difficult. This is because the user needs to input a separate password or perform an authentication procedure through the provided user interface in order to clear security of information.

SUMMARY OF THE INVENTION

Accordingly, the present specification is directed to a display device and a method for controlling the same that substantially obviates one or more problems due to limitations and disadvantages of the related art.

An object of the present specification is to provide a display device that provides feedback for indicating a security on state of the information when information in the security on state is selected.

Another object of the present specification is to provide a display device that detects touch input corresponding to feedback to determine a security on state of selected information.

Another object of the present specification is to provide a display device that detects continuous touch input from selection input as security maintenance input or security off input.

A further object of the present specification is to provide a display device that obtains a fingerprint from security off input to clear a security on state of information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device comprising: a display unit configured to display an image and to sense a touch input; a sensor unit configured to sense a fingerprint from the touch input on the display unit; a storage unit configured to store data; and a processor configured to control the display unit, the sensor unit, and the storage unit, wherein the processor is further configured to: provide feedback for indicating a security on state of selected first information when selection input for selecting the first information in the security on state is detected, when a security off input for clearing security is detected in response to the feedback, obtain the fingerprint using the display unit, and convert the first information in the security on state into a security off state when the obtained fingerprint is matched with a pre-stored fingerprint, when a security maintenance input for maintaining security is detected in response to the feedback, maintain the security on state of the first information, wherein the security off input is a touch input detected for a first period that exceeds a predetermined period after the feedback is provided, and wherein the security maintenance input is a touch input detected for a second period that does not exceed the predetermined period after the feedback is provided.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The terms used in the present specification are defined in consideration of functions used in the present specification, and can be changed according to the intent, conventionally used methods of operators, or advent of new technologies. In specific cases, the terms can be selected by an application. In this case, the meaning of the terms will be described in a corresponding embodiment. Accordingly, definitions of the terms should be understood on the basis of the substantial meaning and the entire description of the present specification instead of simple names of the terms.

Reference will now be made in detail to the embodiments, examples of which are illustrated in the accompanying drawings. However, the embodiments should not be construed as limited to the exemplary embodiments set forth herein.

In the present specification, a display device may provide selected information according to detected selection input of a user. In this case, the selected information may be in a security on state or security off state. Here, the security on state may refer to a state in which access is allowed to only a specific user. Accordingly, the information in the security on state may require a predetermined fingerprint in order to provide the information to the user. In addition, the security off state may refer to a state in which access is allowed to all users. Accordingly, the information in the security off state may not be required to provide the information to the user.

The display device may obtain or not obtain a fingerprint from touch input according to a security state of the selected information. In particular, upon detecting security off input for clearing security of information, the display may obtain a fingerprint from the security off input to clear a security on state of the information, which will be described below with reference to the accompanying drawings. Hereinafter, a display device will be referred to as a 'device' for convenience of description.

Figure 1:
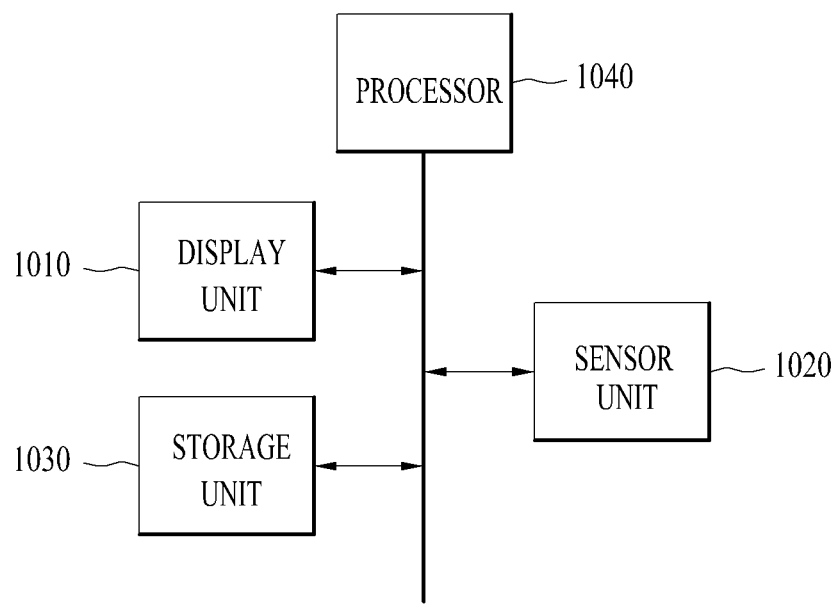
FIG. 1 is a block diagram of a display device according to an embodiment.

FIG. 1 is a block diagram of a display device according to an embodiment. In FIG. 1, the device may include a display unit 1010, a sensor unit 1020, a storage unit 1030, and a processor 1040.

The display unit 1010 may display an image. The display unit 1010 may display the image based on an application executed by the processor 1040 or a control command of the processor 1040. Here, the image may refer to visual information recognizable by eyesight of a user and include an image for execution of a photo, a picture, a text, a moving picture, an application, etc. In addition, the display unit 1010 may sense touch input on the display unit 1010. In this case, the display unit 1010 may include a sensor for sensing touch input, such as a touch sensor, a pressure sensor, etc. so as to sense various touch inputs.

The sensor unit 1020 may sense a fingerprint from the touch input on the display unit 1010. In more detail, the sensor unit 1020 may scan or capture the fingerprint from the touch input on the display unit 1010 to sense the fingerprint. In this case, the sensor unit 1020 may sense the fingerprint using at least one sensor mounted on the device. According to an embodiment, the at least one sensor may include a fingerprint sensor, a pressure sensor, an illumination sensor, a brightness sensor, a touch sensor, a camera sensor, etc. In addition, the at least one sensing unit may include various sensors for sensing a fingerprint from touch input and embodiments of the specification are not limited to the aforementioned embodiment. The aforementioned sensors may be a separate element included in the device or may be integrated as at least one element included in the device.

Furthermore, the sensor unit 1020 may transmit a sensing result to the processor 1040. The processor 1040 may perform various operations based on a sensing result received from the sensor unit 1020.

In particular, in the specification, the sensor unit 1020 may be included in the device together with the display unit 1010. In other words, the sensor unit 1020 may be integrated with the display unit 1010 and may be included in the device. For example, the display unit 1010 and the sensor unit 1020 may have an interlayer structure and may be included in the device. Accordingly, the device may simultaneously sense touch input on the display unit 1010 and a fingerprint of the corresponding touch input.

The storage unit 1030 may store data. In more detail, the storage unit 1030 may store various digital data such as video, audio, a photo, a document, an application, etc. The storage unit 1030 may refer to various digital data storage spaces such as a flash memory, a random access memory (RAM), a solid state drive (SSD), etc. In particular, in the specification, the storage unit 1030 may store various digital data regarding a fingerprint. For example, the storage unit 1030 may store fingerprint image data, data regarding a user corresponding to each fingerprint image, data regarding a security level of each user, etc.

The processor 1040 may control each of the aforementioned units of the device and control data transmission/reception between the units. In addition, the processor 1040 may process data in the device to execute various applications.

The processor 1040 may detect various touch inputs on the display unit 1010 using at least one sensor included in the display unit 1010. In particular, in the specification, the processor 1040 may detect selection input for selection of information, security off input for clearing security of information, and security maintenance input for maintaining security of information. Upon detecting various touch inputs, the processor 1040 may perform a command corresponding to each touch input.

According to an embodiment, upon detecting selection input for selection of information in security on state, the processor 1040 may provide feedback indicating a security on state of the selected information. Here, the feedback may include visual feedback, audible feedback, tactile feedback, and olfactory feedback, which will be described below with reference to FIG. 3.

According to another embodiment, upon detecting security off input, the processor 1040 may obtain a fingerprint using the sensor unit 1020 in order to clear security of information. When the obtained information is matched with a pre-stored fingerprint, the processor 1040 may convert security on state of information into a security off state to clear security of the information. On the other hand, upon detecting security maintenance input, the processor 1040 may not obtain a fingerprint in order to maintain security of information, which will be described below with reference to FIGS. 4A to 5B.

Hereinafter, when each step or operation performed by the device is begun or performed by sensing of user input, the above description is assumed to be applied to a procedure for generating and receiving a signal according to the sensed user input without its repeated description. In addition, it may be expressed that the processor 1040 controls the device or at least one unit included in the device according to user input and the processor 1040 may be equated to the device.

FIG. 1 is a block diagram of the device according to an embodiment. The separately indicated blocks are formed by logical elements of the device. Accordingly, the aforementioned elements of the device may be mounted as a single chip or a plurality of chips according to a design of the device.

Figure 2:
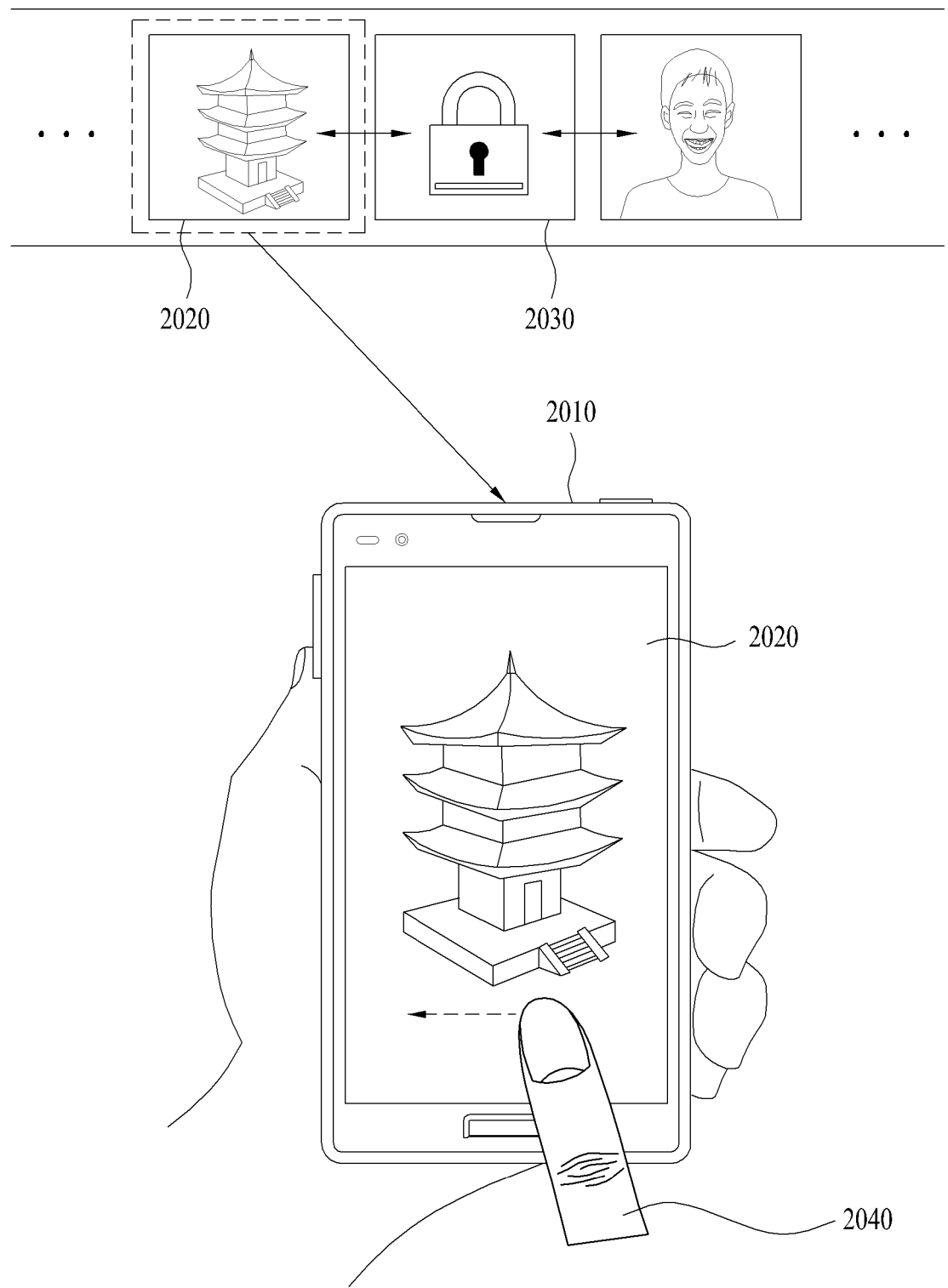
FIG. 2 is a diagram illustrating an embodiment of a display device for detecting selection input for selection of information according to an embodiment of the present specification.

FIG. 2 is a diagram illustrating an embodiment of a display device 2010 for detecting selection input for selection of information according to an embodiment of the present specification.

In the specification, the device 2010 may provide various information. In more detail, the device 2010 may provide visual information, audible information, tactile information, and/or olfactory information. When the selected information is visual information, the corresponding information may correspond to a picture, a photo, a home image, a document, a text, an application execution image, or a moving picture.

The information may be provided according to selection input 2040 for selection of information to be output. In more detail, the device 2010 may detect the selection input 2040 for selection of information and output the selected information according to the detected selection input 2040. Here, the selection input 2040 may refer to various touch inputs for selection of information. In particular, in the specification, the selection input 2040 may refer to touch input for selection of information 2030 in security on state.

For example, when information 2020 in security off state and the information 2030 in security on state are sequentially provide, the device 2010 may detect the selection input 2040, that is, slide input for converting the security off state of information 2020 into the security on state. Here, the sliding touch input 2040 for conversion into the information 2030 in security on state may be a representative example of the selection input 2040.

Upon detecting the selection input 2040, the device 2010 may provide feedback for indicating a security on state of the selected information 2030. A user may perform security off input for clearing security of information or security maintenance input for maintaining security of information in response to the provided feedback, which will be described in detail with reference to FIGS. 3 to 5B.

Hereinafter, for convenience of description, description will be given in terms of the device 2010 that detects the selection input 2040 for selecting the information 2030 in security on state while the information 2020 in security off state is provided, as illustrated in FIG. 2. In addition, hereinafter, description will be given in terms of the device 2010 in which the selection input 2040 is sliding touch input 2040 for selection of the information 2030 in security on state.

Figure 3:
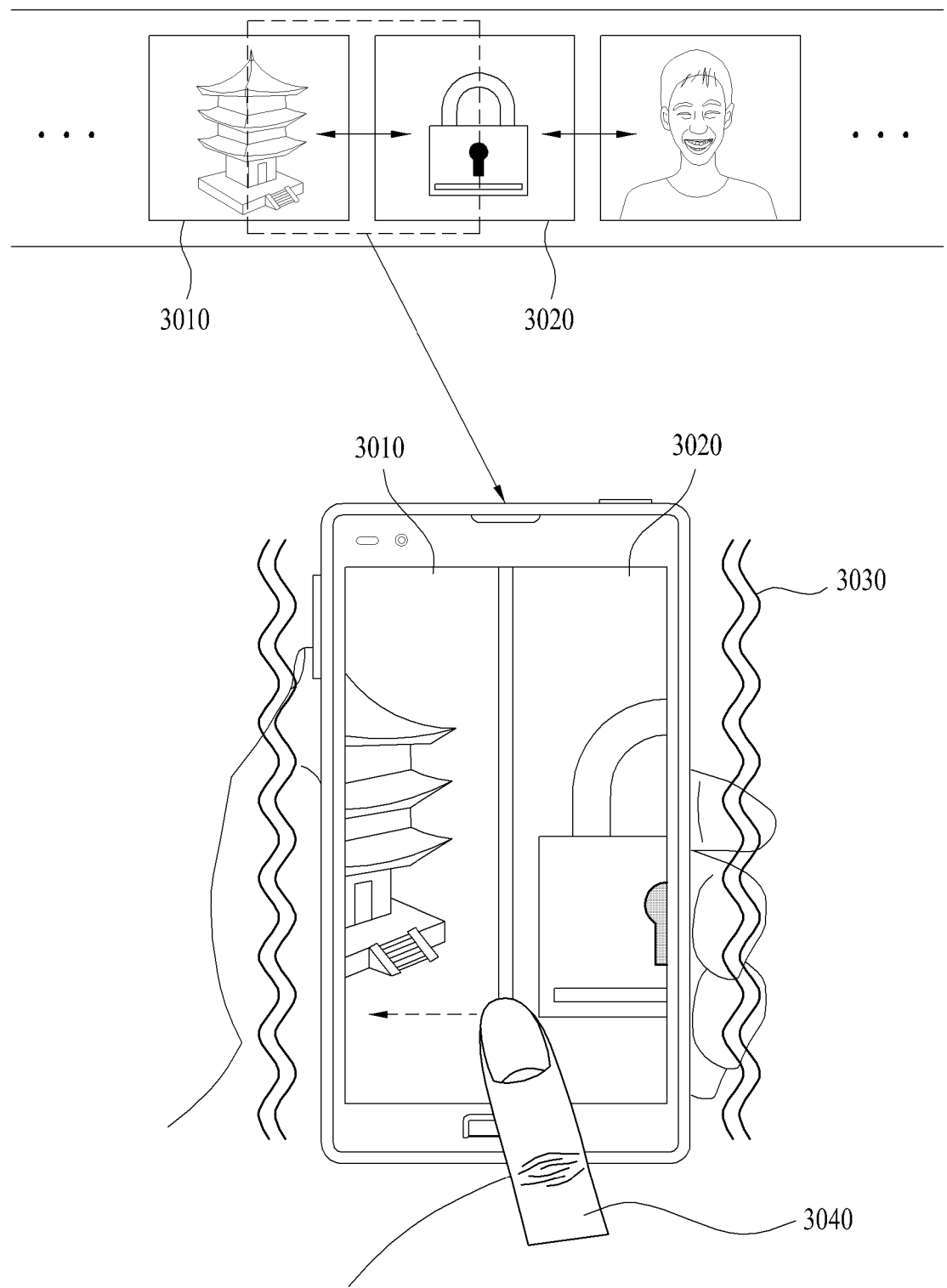
FIG. 3 is a diagram illustrating an embodiment of a display device that provides feedback for indicating a security on state of selected information according to selection input.

FIG. 3 is a diagram illustrating an embodiment of a display device that provides feedback for indicating a security on state of selected information according to selection input.

The device may detect selection input 3040 for selection of information 3020 in security on state. In this case, the device may provide feedback 3030 for indicating a security on state of the selected information 3020. For example, while the device provides information 3010 in security off state, upon detecting the selection input 3040 for selection of the information 3020 in security on state, the device may generate vibration to inform the user of the security on state of the selected information 3020. When the information 3020 in security on state is selected, the device may display a security image (e.g., a lock image) instead of the selected information 3020 to inform the user of the security on state of the selected information 3020. In addition, the device may provide various types of feedbacks 3030 such as visual, audible, tactile, and/or olfactory feedbacks for indicating the security on state of the information 3020, which will be described below with reference to FIG. 6.

The device may provide the feedback 3030 for indicating a security on state to inform the user of the security on state of the information 3020 and to simultaneously provide an option for selection of security maintenance input or security off input. Thus, the user may perform security off input or security maintenance input in response to the provided feedback 3030 to determine a security state of the selected information 3020. The security off input will be described below with reference to FIGS. 4A and 4B and the security maintenance input will be described below with reference to FIGS. 5A and 5B.

Figure 4A:
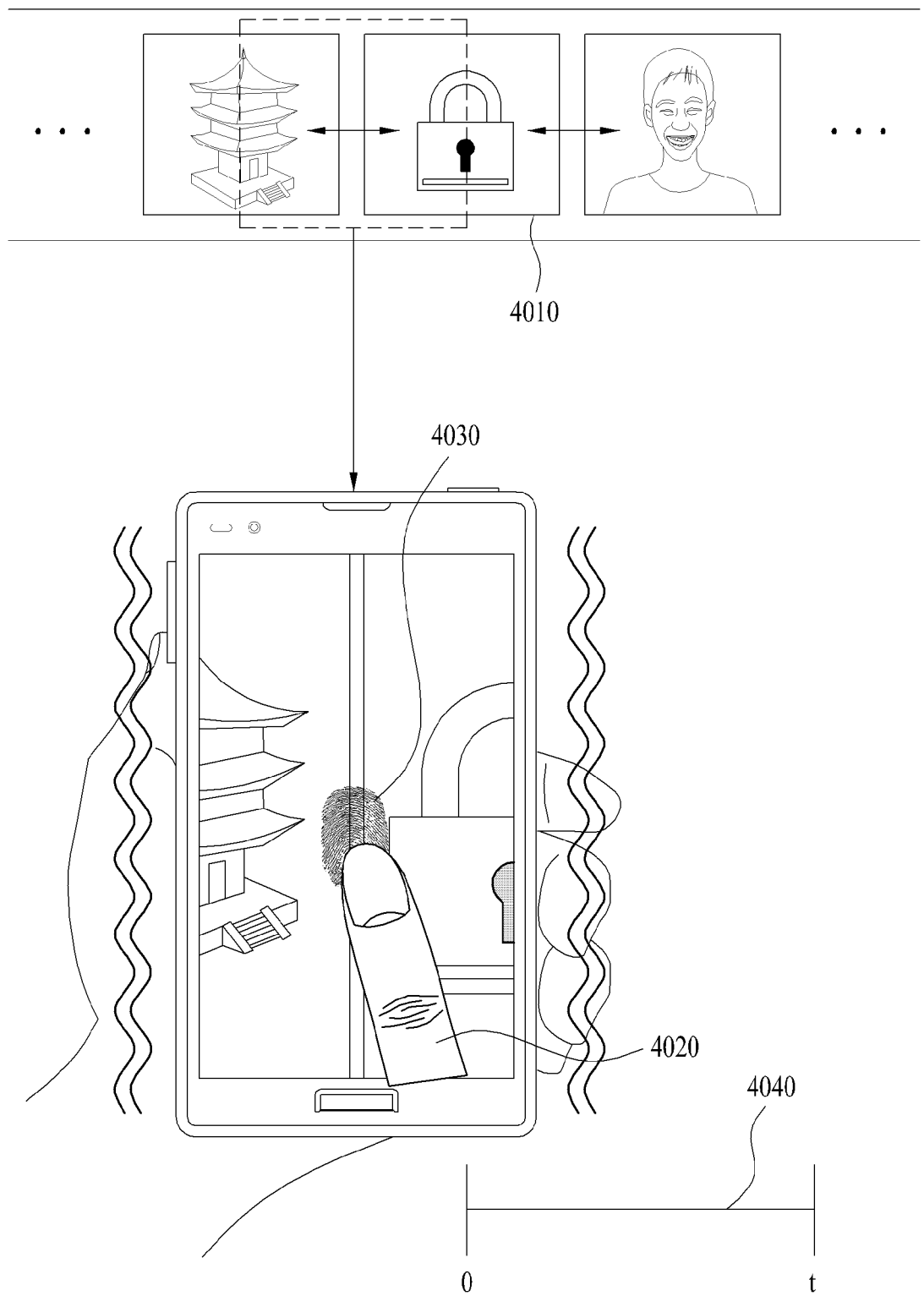
FIG. 4A is a diagram illustrating an embodiment of a display device for detecting security off input.

FIG. 4A is a diagram illustrating an embodiment of a display device for detecting security off input.

When selected information is in a security on state, the device may provide feedback for indicating a security on state of information 4010, as described above. Furthermore, the device may provide feedback and then detect security off input 4020. Here, the security off input 4020 may refer to user input for clearing a security on state of the selected information 4010. In addition, the security off input 4020 may refer to user input for converting the security on state of information 4010 into a security off state.

The security off input 4020 may be configured according to various embodiments. According to an embodiment, the security off input 4020 may be touch input on a display unit, which is detected by maintaining the touch input for a period that exceeds a predetermined period 4040, in response to feedback. In other words, when the feedback is provided and then the detected touch input is maintained for a period that exceeds the predetermined period 4040, the device may detect the security off input 4020. In this case, the security off input 4020 may be touch input that is "continuously" detected for a period that exceeds the predetermined period 4040. For example, the security off input 4020 may be long-press touch input or sliding touch input. The device may count a period for maintaining the detected touch input after feedback is provided. When the maintenance period of the corresponding touch input exceeds the predetermined period 4040, the device may regard the corresponding touch input as the security off input 4020 to clear security of the selected information 4010.

According to another embodiment, the security off input 4020 may be touch input, a length of which exceeds a predetermined length, in response to feedback. In other words, when the detected touch input is perform by as much as a length that exceeds the predetermined length after feedback is provided, the device may detect the security off input 4020. Thus, for example, the security off input 4020 may be long-press touch input, sliding touch input, dragging touch input, or pattern input. The device may detect the length of the detected touch input after the feedback is provided. When the length of the detected touch input exceeds the predetermined length, the device may regard the corresponding touch input as the security off input 4020 to clear a security of the selected information 4010.

According to another embodiment, the security off input 4020 may be touch input directed in a predetermined direction in response to feedback. In other words, when the touch input, detected after feedback is provided, is directed in the predetermined direction (e.g., a first direction), the device may detect the security off input 4020. After the feedback is provided, the device may detect a direction in which the detected touch input is moved. When the direction of the detected touch input is a predetermined direction, the device may regard the corresponding touch input as the security off input 4020 to clear security of the selected information 4010.

In this case, the device may provide an indicator (not shown) for guiding a touch input direction of the security off input 4020.

The security off input 4020 may be continuous touch input from selection input. In other words, the security off input 4020 may be touch input that is continuously detected from selection input for selection of the information 4010 in security on state. Thus, the security off input 4020 may refer to continuous touch input from selection input and may be input that is detected for a period that exceeds the predetermined period 4040 after feedback is provided. Accordingly, the user may maintain the selection input for a predetermined period 4040 to select the information 4010 in security on state and to simultaneously clear a security on state of the information 4010.

Upon detecting the security off input 4020, the device may obtain a fingerprint 4030 of a user in order to clear a security on state of the selected information 4010 in order to determine whether a user who uses the device is allowed access to the selected information 4010. In this case, according to various embodiments, the device may obtain the fingerprint 4030 of the user. According to an embodiment, the device may obtain the fingerprint 4030 of the user from the detected security off input 4020. According to another embodiment, the device may provide a user interface for acquisition of the fingerprint 4030 of the user, which will be described below in detail with reference to FIG. 7.

Upon obtaining the fingerprint 4030, the device may match the obtained fingerprint 4030 with a pre-stored fingerprint. In more detail, the device may compare the obtained fingerprint 4030 and the pre-stored fingerprint and determine whether the obtained fingerprint 4030 is matched with the pre-stored fingerprint. Here, the pre-stored fingerprint may refer to a fingerprint pre-stored in a storage unit and refer to a fingerprint corresponding to a user who is allowed access to the information 4010 in security on state.

When the obtained fingerprint 4030 and the pre-stored fingerprint are matched with each other according to a comparison result that a matched degree between two fingerprints exceeds a threshold, the device may convert a security on state of the selected information 4010 into a security off state. This is because matching between the obtained fingerprint 4030 and the pre-stored fingerprint means that a user of the security off input 4020 is allowed access to the information 4010 in security on state. When the security on state of information 4010 is converted into a security off state, the device may output the corresponding information 4010, which will be described below in detail with reference to FIG. 6.

On the other hand, when the obtained fingerprint 4030 and the pre-stored fingerprint are not matched with each other according to a comparison result that the matched degree between two fingerprints does not exceed a threshold, the device may maintain a security on state of the information 4010. This is because mismatch between the obtained fingerprint 4030 and the pre-stored fingerprint means that a user of the security off input 4020 is not allowed access to the information 4010 in security on state. When the security on state of the information 4010 is maintained, the device may skip the corresponding information 4010 and provide an indicator for indicating a security on state, which will be described below in detail with reference to FIG. 5B.

Figure 4B:
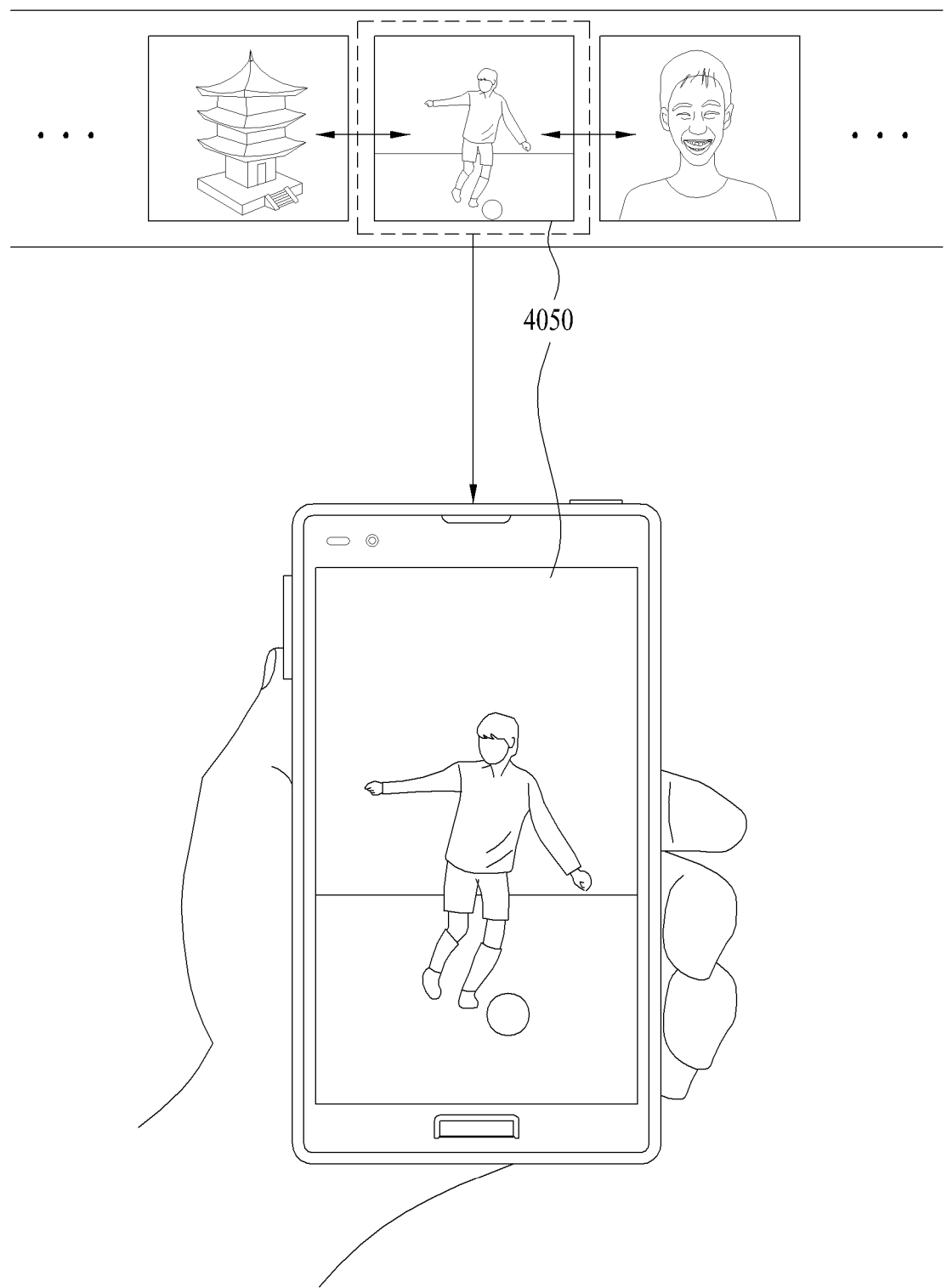
FIG. 4B is a diagram illustrating an embodiment of a display device that provides information, a security on state of which is cleared according to security off input.

FIG. 4B is a diagram illustrating an embodiment of a display device that provides information, a security on state of which is cleared according to the security off input 4020. FIG. 4B may be a diagram of an operation subsequent to the operation of the device described with reference to FIG. 4A.

When a security on state of the selected information 4010 is cleared, the device may output information 4050, a security on state of which is cleared. Here, the information may refer to visual information, audible information, tactile information, and/or olfactory information. Accordingly, when the selected information 4010 is visual information and the security on state of the selected information 4010 is cleared, the device may display the information 4050, the security on state of which is cleared, on a display unit. When the selected information 4010 is audible information and the security on state of the selected information 4010 is cleared, the device may output information, the security on state of which is cleared, through an audio input/output unit. Thus, when the security on state of the selected information 4010, the device may output the information 4050 according to characteristics of information, security of which is cleared.

Figure 5A:
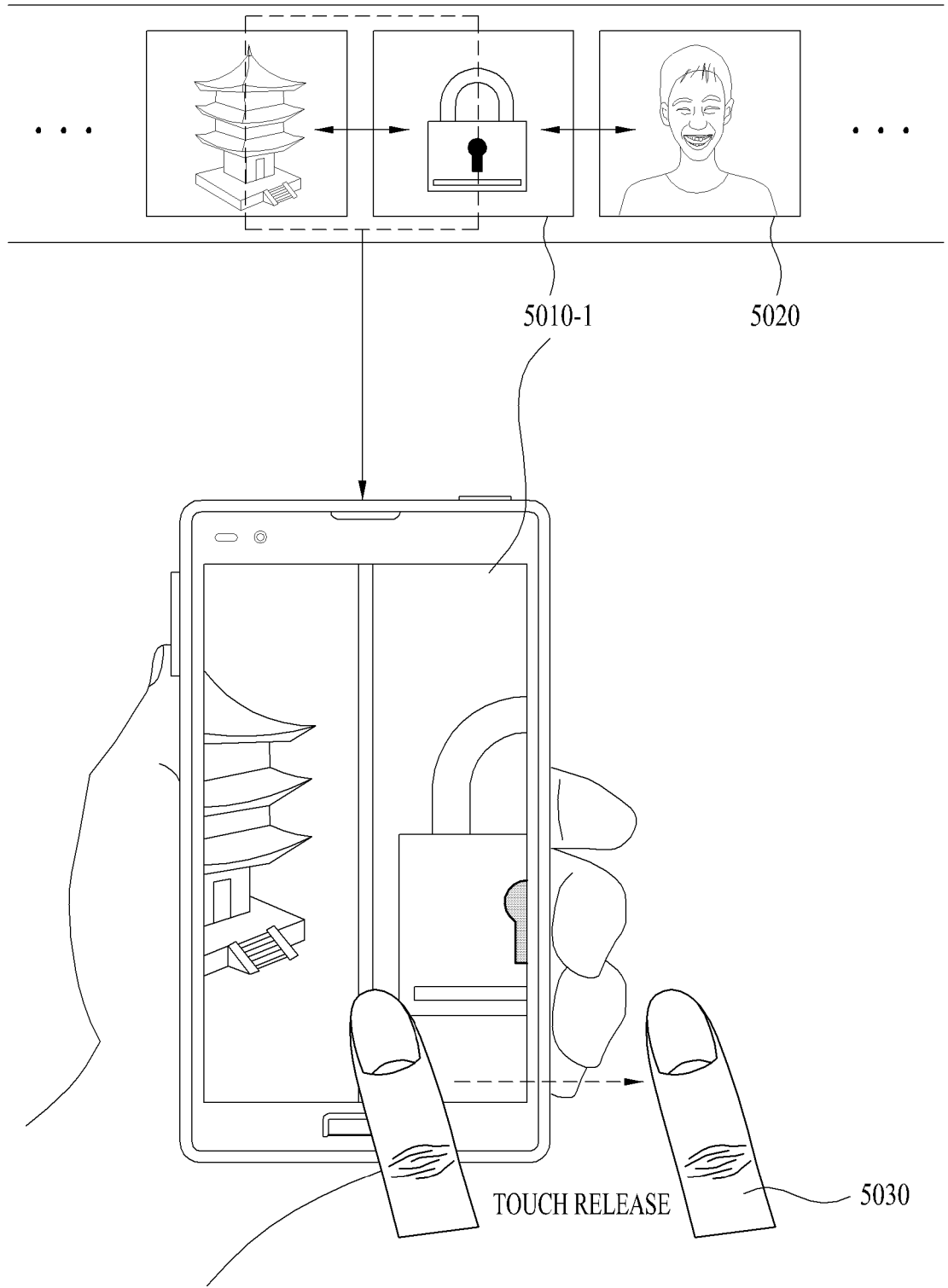
FIG. 5A is a diagram illustrating an embodiment of a display device for detecting security maintenance input.

FIG. 5A is a diagram illustrating an embodiment of a display device for detecting security maintenance input.

When selected information 5010-1 is in a security on state, the device may provide feedback for indicating a security on state of the information 5010-1. Furthermore, the device may provide feedback and then detect security maintenance input 5030. Here, the security maintenance input 5030 may refer to user input for maintaining a security on state of the selected 5010-1.

The security maintenance input 5030 may be configured according to various embodiments. According to an embodiment, the security maintenance input 5030 may be touch input on a display unit, which is not detected by maintaining the touch input for a period that exceeds a predetermined period. For example, the security maintenance input 5030 may be short-press touch input. The device may count maintenance period of touch input detected after the feedback is provided. When the maintenance period of the corresponding touch input is equal to or more than the predetermined period, the device may regard the corresponding touch input as the security maintenance input 5030 to maintain a security on state of the selected information 5010-1. In addition, even if the touch input is not detected after the feedback is provided, the device may maintain a security on state of the information 5010-1, which will be described below with reference to selection input.

According to another embodiment, the security maintenance input 5030 may be touch input, a length of which does not exceed predetermined length. In other words, when touch input after feedback is provided is detected by as much as a predetermined length or less, the device may detect the security maintenance input 5030. Thus, the security maintenance input 5030 may be short-press touch input or pattern input. The device may detect a length of touch input detected after feedback is provided. When the length of the detected touch input is a predetermined length or less, the device may regard the corresponding touch input as the security maintenance input 5030 to clear a security on state of the selected information 5010-1.

According to another embodiment, the security maintenance input 5030 may be touch input directed in a predetermined direction in response to feedback. In other words, when the touch input detected after feedback is provided is directed in the predetermined direction (e.g., a second direction), the device may detect the security maintenance input 5030. After providing feedback, the device may detect a direction in which the detected touch input is moved. When the detected touch input is directed in the predetermined direction, the device may regard the corresponding touch input as the security maintenance input 5030 to maintain a security on state of the selected information 5010-1. In this case, the device may provide an indicator (not shown) for guiding a touch input direction of the security maintenance input 5030. According to the present embodiment, the predetermined direction may be different from the predetermined direction described with reference to FIG. 4A. Thus, the device may differentiate security off input and the security maintenance input 5030 based on the direction in which the touch input is direction to determine a security state of the information 5010-1.

The security maintenance input 5030 may be continuous touch input from selection input. In other words, the security maintenance input 5030 may be touch input that is continuously detected from selection input for selection of the information 5010-1 in security on state. Thus, the security maintenance input 5030 may refer to continuous touch input from selection input and may be input that is detected for a predetermined period or less after feedback is provided. Accordingly, when continuous touch input from selection input is detected for a predetermined period or less after feedback is provided or the selection input is simultaneously released when feedback is provided, the device may detect the security maintenance input 5030. The user may simultaneously release selection input when receiving feedback or may release the selection input after receiving feedback and the selection input is maintained for a predetermined period or less to select the information 5010-1 in security on state and to simultaneously maintain the security on state of the information 5010-1.

Figure 5B:
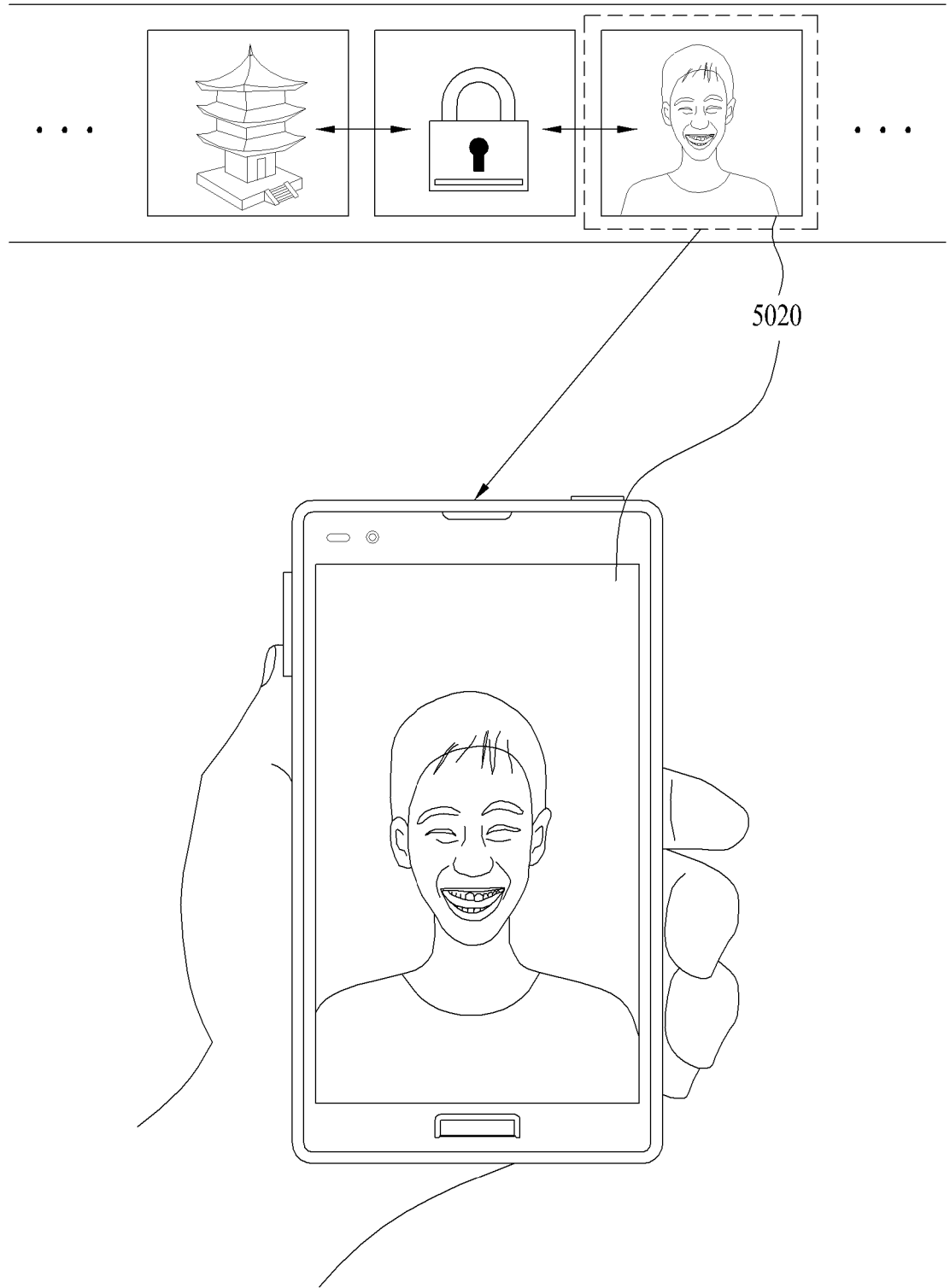
FIG. 5B is a diagram illustrating an embodiment of a display device that maintains a security on state of information according to security maintenance input.

FIG. 5B is a diagram illustrating an embodiment of a display device that maintains a security on state of information according to security maintenance input. FIG. 5B may be a diagram of an operation subsequent to the operation of the device described with reference to FIG. 5A.

When the security on state of the information 5010-1 is maintained according to selection input, the device may provide the information 5010-1 in security on state. When the security on state of the information 5010-1 is maintained, since the corresponding information 5010-1 should not be exposed to outside, the device may provide a predetermined image (e.g., a lock image), predetermined sound, predetermined tactile, predetermined vibration, etc. as the information 5010-1 in security on state. For example, when the visual information 5010-1 is selected and the security on state of the corresponding information 5010-1 is maintained, the device may display the predetermined image as the information 5010-1 in security on state. In addition, when the audible information 5010-1 is selected and the security on state of the corresponding information 5010-1 is maintained, the device may output predetermined voice as the information 5010-1 in security on state.

When the security on state of the information 5010-1 selected according to selection input is maintained, the device may not provide the information 5010-1 in security on state to the user and may skip the information 5010-1 in security on state. In this case, the device may skip the information 5010-1 in security on state and provide neighboring information 5020 of the skipped information 5010-1. Here, the neighboring information 5020 may be information 5020 positioned in a forward or reverse direction of the skipped information 5010-1 in the same information group. Here, the information group may refer to a group containing a plurality of information 5010-1 and 5020 having a predetermined conversion direction and/or a predetermined sequence. In addition, the neighboring information 5020 may be provided subsequent to the skipped information 5010-1 and may be information 5020 in security off state. Accordingly, the device may skip security set information 5010-1 and provide the neighboring information 5020 instead of the corresponding information 5010-1. Through this, the device may maintain the information 5010-1.

Furthermore, the device may be provided by combining the aforementioned embodiments. For example, when the security on state of the information 5010-1 is maintained, the device may provide the information 5010-1 in security on state or skip the information 5010-1 in security on state according to a security level of information. For example, when the security level of the information 5010-1 is set high, the device may skip the information 5010-1 and provide the neighboring information 5020 even if the corresponding information 5010-1 is selected. On the other hand, when the security level of the information 5010-1 is set low and the corresponding information 5010-1 is selected, the device may provide the information 5010-1 in security on state. Accordingly, when the corresponding information 5010-1 is selected, the device may output a predetermined image, as described in detail above.

Figure 6:
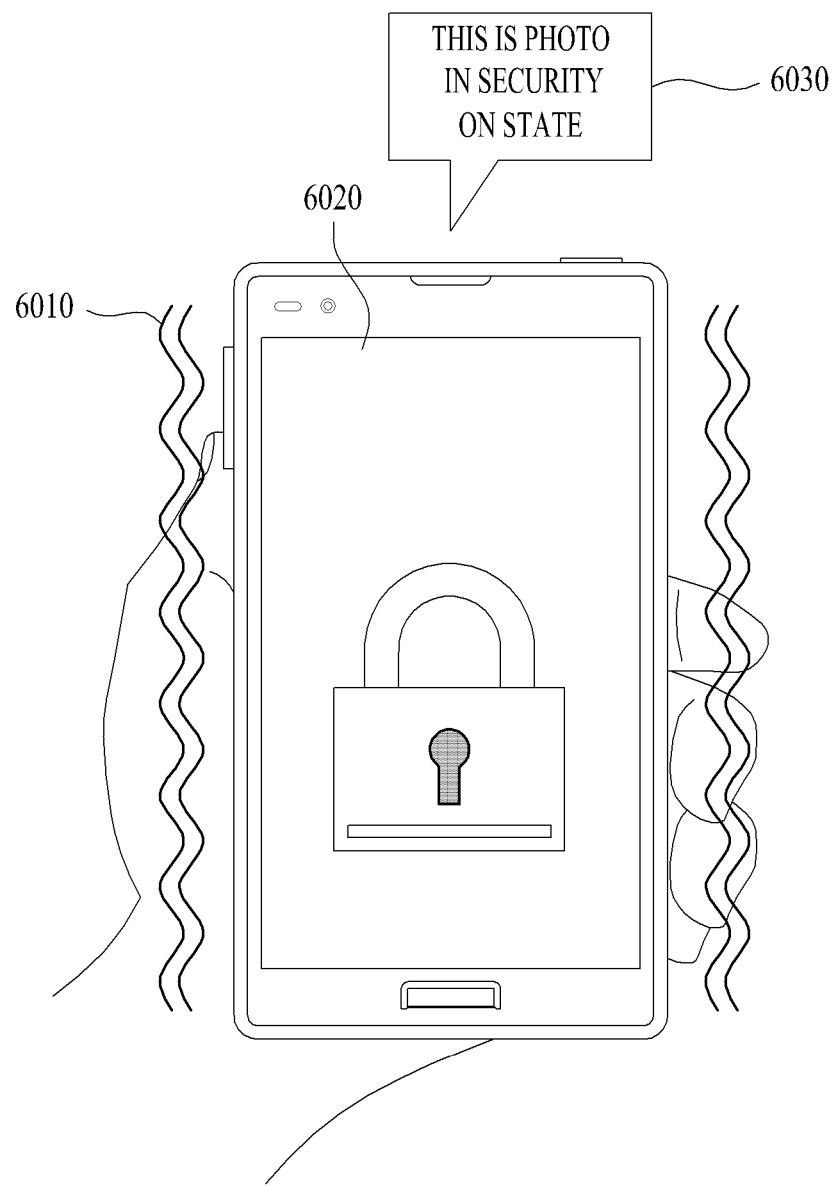
FIG. 6 is a diagram illustrating a display device that provides feedback for indicating a security on state of information.

FIG. 6 is a diagram illustrating a display device that provides feedback for indicating a security on state of information.

As described above, when information in security on state is selected, the device may provide feedback for indicating a security on state of the selected information. The feedback may be configured according to various embodiments. For example, the feedback may be visual feedback 6020, audible feedback 6030, tactile feedback 6010, and/or olfactory feedback.

According to an embodiment, when the device provides the visual feedback 6020, the device may provide a security image for indicating a security on state of the selected information as the visual feedback 6020. Here, the security image may refer to an image for indicating a security on state of information. For example, the security image may be a lock image, as illustrated in FIG. 6.

According to another embodiment, when the device provides the audible feedback 6030, the device may provide voice for indicating a security on state of the selected information as the audible feedback 6030. Here, the voice may be sound for indicating a security on state of information. For example, when information in security on state is selected, the device may provide a voice "This is photo in security on state." as the audible feedback 6030.

According to another embodiment, when the device provides the tactile feedback 6010, the device may provide vibration for indicating a security on state of the selected information as the tactile feedback 6010. For example, when information in security on state is selected, the device may vibrate the device or provide tactile feedback as the tactile feedback 6010.

In addition, the device may provide various feedbacks 6010, 6020, and 6030 for indicating a state of the selected information and embodiments of the specification is not limited to the aforementioned embodiment. Through the feedbacks 6010, 6020, and 6030, the user may recognize that the selected information is information in security on state.

Figure 7:
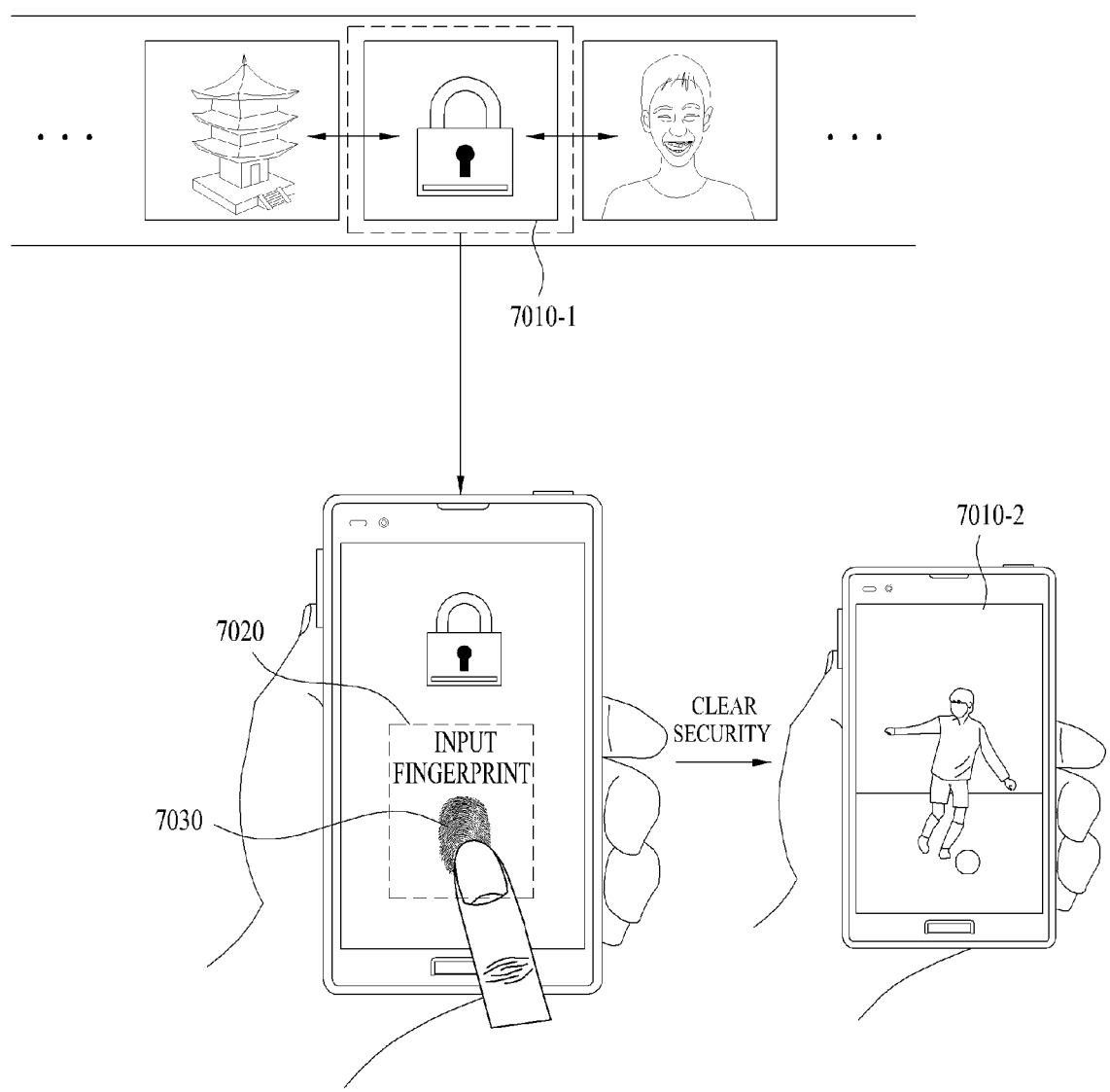
FIG. 7 is a diagram illustrating an embodiment of a display device that provides a fingerprint input interface for acquisition of a fingerprint.

FIG. 7 is a diagram illustrating an embodiment of a display device that provides a fingerprint input interface for acquisition of a fingerprint.

Upon detecting a security off input for clearing security of selected information, the device may obtain a fingerprint 7030 in order to determine whether a user of security off input is allowed access to the corresponding information. In this case, although the device may obtain the fingerprint 7030 directly from the security off input, the device may obtain the fingerprint 7030 through a fingerprint input interface for acquisition of the fingerprint 7030.

In detail, upon detecting the security off input, the device may provide the fingerprint input interface for acquisition of the fingerprint 7030. As illustrated in FIG. 7, the fingerprint input interface may provide an input window 7020 for receiving the fingerprint 7030 of a user in order to obtain the fingerprint 7030 of the user, and the user may touch the input window 7020 for a predetermined period or more to input the fingerprint 7030. In this case, the device may provide a guide message such as "Input fingerprint." such that the user inputs the fingerprint 7030.

The device may provide various types of fingerprint input interfaces in order to the fingerprint 7030 of the user. Embodiments of the specification are not limited to the embodiment of FIG. 7. Upon obtaining the fingerprint 7030 through the fingerprint input interface, the device may compare the obtained fingerprint 7030 with a pre-stored fingerprint to determine whether the two fingerprints are matched with each other. When the obtained fingerprint 7030 and the pre-stored fingerprint are matched with each other according to a comparison result that exceeds a threshold, the device may clear security on state 7010-1 and convert the security on state 7010-1 into a security off state 7010-1, as described with reference to FIG. 4A.

Figure 8:
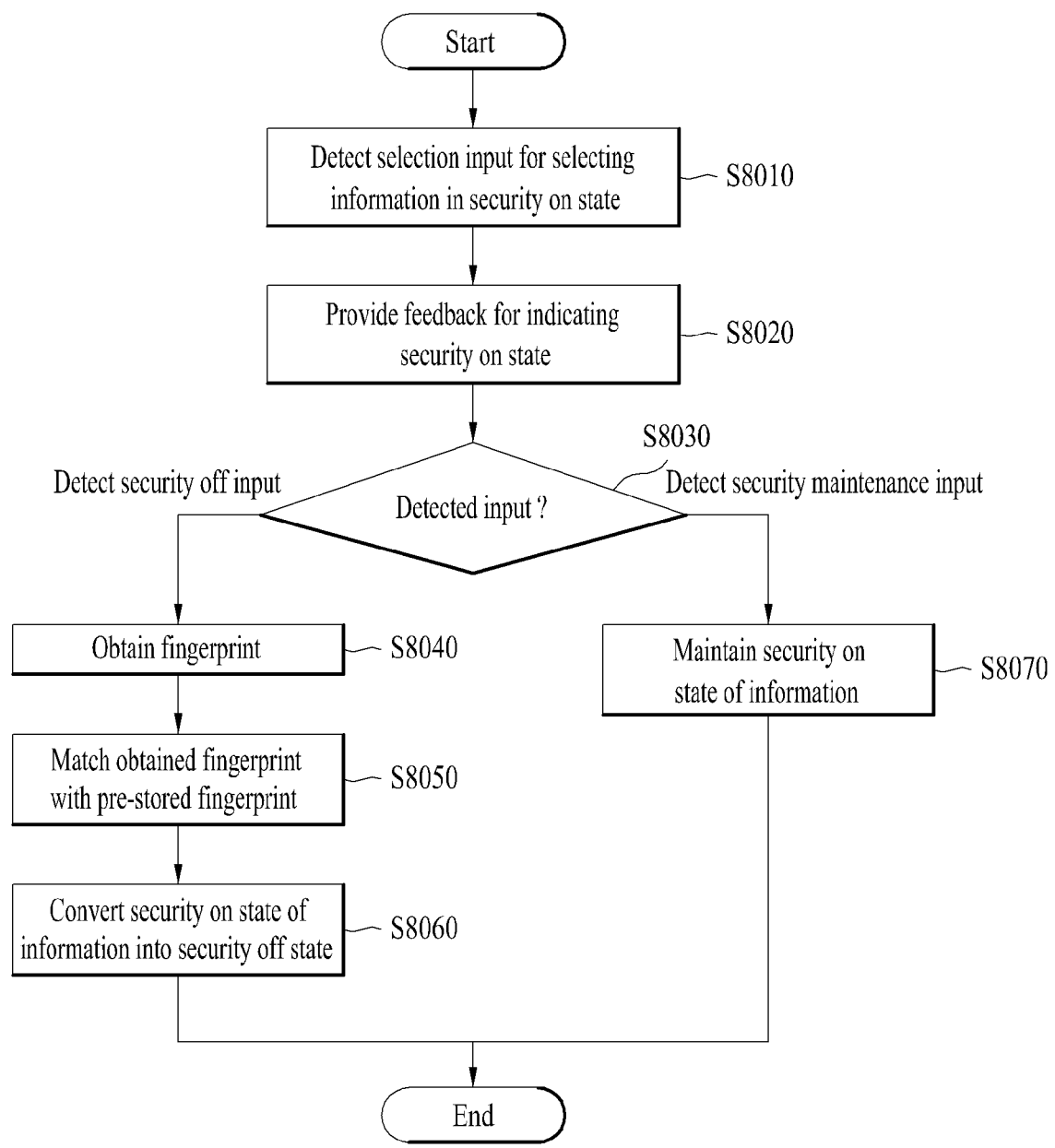
FIG. 8 is a flowchart of a method for controlling a display device.

FIG. 8 is a flowchart of a method for controlling a display device. In this flowchart, similar or repeated detailed description given with reference to FIGS. 1 to 7 will be omitted herein.

First, the device may detect selection input for selection of information in security on state (S8010). Here, the information in security on state may refer to information to which access is allowed to only a specific user. In addition, the selection input may refer to various touch inputs for selection of information. In particular, in the specification, the selection input may refer to touch input for selection of information in security on state. The device may detect selection input using a display unit, as described with reference to FIG. 1.

Then, the device may provide feedback for indicating a security on state (S8020). In more detail, when information selected according to the selection input is in a security on state, the device may provide feedback for indicating a security on state of the information. The device may provide visual feedback, audible feedback, tactile feedback, and/or olfactory feedback, as described with reference to FIG. 6.

Then, the device may determine whether the input detected in response to feedback is security off input or security maintenance input (S8030). Here, the security off input may be predetermined user input for converting a security on state of the selected information into a security off state. In particular, the security off input may refer to touch input detected for a period that exceeds a predetermined period after feedback is provided, as described with reference to FIG. 4A. The security maintenance input may be predetermined user input for maintaining security on state of the selected information. In particular, the security maintenance input may be touch input that is not detected by maintaining the touch input for a period that exceeds a predetermined period, as described with reference to FIG. 5A.

Upon detecting the security off input, the device may obtain a fingerprint of a user of the security off input (S8040). According to an embodiment, the device may obtain the fingerprint from the security off input, as described with reference to FIG. 4A. According to another embodiment, the device may provide a fingerprint input interface for acquisition of a fingerprint of a user to obtain the fingerprint through the corresponding interface, as described with reference to FIG. 7.

Then, the device may match the obtained fingerprint with a pre-stored fingerprint (S8050). Matching between the obtained fingerprint and the pre-stored fingerprint may refer to a case in which the obtained fingerprint and the pre-stored fingerprint are compared and two fingerprints are matched with each other according to a comparison result that exceeds a threshold, as described with reference to FIG. 4A.

Then, the device may convert a security on state of information into a security off state (S8060). This is because matching between the obtained fingerprint and the pre-stored fingerprint means that a user of the security off input is allowed access to information in security on state. When security on state of information is cleared, the device may output the corresponding information. The information may include visual information, audible information, tactile information, and olfactory information. Although not shown in this flowchart, when the obtained fingerprint and the pre-stored fingerprint are not matched with each other, the device may maintain a security on state of information, as described with reference to FIG. 4A.

Upon detecting security maintenance input in operation S8030, the device may maintain a security on state of information (S8070). When a security on state of information is maintained, the device may provide information in security on state or skip information in security on state according to selection input of the user, as described with reference to FIG. 5B.

For convenience of description, diagrams have been separately described. However, it may be possible to obtain a new embodiment by combining the aforementioned embodiments described with reference to each diagram. In addition, according to needs of one of ordinary skill in the art, a design of a computer readable recording medium having recorded thereon a program for executing the aforementioned embodiments is within the scope of the present specification.

The device and the method for controlling the same according to the aforementioned embodiments may be configured by selectively combining an entire or partial portion of the aforementioned embodiments in various modified forms rather than being limited to the configuration and method of the aforementioned embodiments.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

The device and the method for controlling the same according to the present specification can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), magnetic tapes, floppy disks, optical data storage devices, etc. In addition, the computer readable recording medium may be embodied as a carrier wave such as transmission via the Internet. The computer readable recording medium can also be distributed over network coupled computer systems so that the computer readable code is stored and executed in a distributed fashion.

In the present specification, an object invention and a method invention have been described. If necessary, both inventions may be subsidiarily applied.

According to an embodiment, a display device provides feedback for indicating a security on state of information, and thus, a user may select information and may simultaneously and easily recognize a security state of selected information.

According to another embodiment, a display device may detect continuous touch input from selection input as security maintenance input or security off input such that a user may determine a security state of information by simple touch input.

According to another embodiment, a display device may obtain a fingerprint from security off input to clear a security on state of information so as to more simply and accurately determine whether a user is allowed access to information in security on state.

Detailed advantages of the embodiments have been described above.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A display device comprising:
   a display unit configured to display an image and to sense a touch input;
   a sensor unit configured to sense a fingerprint from the touch input on the display unit;
   a storage unit configured to store data; and
   a processor configured to control the display unit, the sensor unit, and the storage unit, wherein the processor is further configured to:
   provide feedback for indicating a security on state of first information when a touch input for selecting the first information is detected,
   detect a security off input when the touch input for selecting the first information is detected during a first period,
   obtain the fingerprint continuously during the first period when the security off input is detected,
   convert the security on state of the first information to a security off state when the obtained fingerprint is matched with a pre-stored fingerprint during the first period,
   detect a security maintenance input when the touch input is released after a second period, and
   maintain the security on state of the first information when the security maintenance input is detected in response to the feedback,
   wherein the first period is longer than the second period.

2. The display device according to claim 1, wherein the processor, when the security off input is detected, is further configured to obtain the fingerprint from the touch input, and convert the security on state of the first information to the security off state when the obtained fingerprint is matched with the pre-stored fingerprint.

3. The display device according to claim 1, wherein the processor, when the security off input is detected, is further configured to compare the obtained fingerprint with the pre-stored fingerprint, and convert the security on state of the first information to the security off state when a matched degree between the obtained fingerprint and the pre-stored fingerprint exceeds a threshold.

4. The display device according to claim 3, wherein the processor is further configured to maintain the security on state of the first information when the matched degree between the obtained fingerprint and the pre-stored fingerprint does not exceed the threshold.

5. The display device according to claim 1, wherein the security off input is a long-press touch input and the security maintenance input is a short-press touch input.

6. The display device according to claim 1, wherein the processor is further configured to:
   detect a length of a touch input detected in response to the feedback,
   detect the security off input when the detected length of the touch input exceeds a predetermined length, and
   detect the security maintenance input when the length does not exceed the predetermined length.

7. The display device according to claim 6, wherein the security off input is a sliding touch input or a dragging touch input on the display unit.

8. The display device according to claim 1, wherein:
   the security off input is a touch input directed to a first direction after the feedback is provided, and
   the security maintenance input is a touch input directed to a second direction after the feedback is provided.

9. The display device according to claim 1, wherein the security off input or the security maintenance input is a continuous touch input from the selection input.

10. The display device according to claim 1, wherein the processor, when the security off input is detected, is further configured to provide a fingerprint input interface for obtaining the fingerprint.

11. The display device according to claim 10, wherein the processor is further configured to obtain the fingerprint using the fingerprint input interface, and convert the security on state of the first information to the security off state when the obtained fingerprint is matched with the pre-stored fingerprint.

12. The display device according to claim 1, wherein the feedback includes visual feedback, audible feedback, tactile feedback, and olfactory feedback.

13. The display device according to claim 1, wherein the first information includes visual information, audible information, tactile information, and olfactory information.

14. The display device according to claim 13, when the first information is the visual information, wherein the first information corresponds to a picture, a photo, a home image, a document, a text, an application execution image, or a moving picture.

15. The display device according to claim 1, wherein the processor is further configured to skip the first information and provide second information as neighboring information of the first information when the security on state of the first information is maintained according to the security maintenance input.

16. The display device according to claim 15, wherein the second information is positioned in a forward or reverse direction of the first information in an information group containing the first information and the second information.

17. A method for controlling a display device, the method comprising:
   detecting a touch input for selecting first information;
   providing feedback for indicating a security on state of the first information;
   detecting a security off input when the touch input for selecting the first information is detected during a first period;

obtaining a fingerprint continuously during the first period when the security off input is detected;
converting the security on state of the first information to a security off state if the obtained fingerprint is matched with a pre-stored fingerprint during the first period;
detecting a security maintenance input when the touch input is released after a second period; and
maintaining the security on state of the first information when the security maintenance input is detected in response to the feedback,
wherein the first period is longer than the second period.

* * * * *